US006279348B1

(12) United States Patent
Elledge

(10) Patent No.: US 6,279,348 B1
**(45) Date of Patent: *Aug. 28, 2001**

(54) DIFFERENTIAL PRESSURE PROCESS FOR FABRICATING A FLAT-PANEL DISPLAY FACE PLATE WITH INTEGRAL SPACER SUPPORT STRUCTURES

(75) Inventor: Jason B. Elledge, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 09/636,178

(22) Filed: Aug. 10, 2000

Related U.S. Application Data

(63) Continuation of application No. 08/795,752, filed on Feb. 6, 1997, now Pat. No. 6,101,846.

(51) Int. Cl.[7] ..................................................... C03B 29/00

(52) U.S. Cl. .................................... 65/102; 65/44; 65/45; 65/46; 65/54; 65/55; 65/63; 65/64; 65/93; 65/94; 65/106; 65/107; 65/138; 65/140; 65/157; 65/273; 264/510; 264/511; 264/512; 264/553; 264/554; 264/571; 264/316; 313/469; 313/476; 313/482; 445/24

(58) Field of Search .................................... 65/44, 45, 46, 65/54, 55, 63, 64, 93, 94, 102, 106, 107, 138, 140, 157, 273; 313/482, 476, 469; 264/510, 511, 512, 553, 554, 571, 316; 445/24

(56) References Cited

U.S. PATENT DOCUMENTS 370,176 9/1887 Brogan et al. .

(List continued on next page.)

FOREIGN PATENT DOCUMENTS 242357 1/1965 (AT) .
283695 10/1952 (CH) .

(List continued on next page.)

*Primary Examiner*—Michael P. Colaianni
(74) *Attorney, Agent, or Firm*—TraskBritt

(57) ABSTRACT

A process for fabricating a face plate for a flat panel display such as a field emission cathode type display, the face plate having integral spacer support structures is disclosed. Also disclosed is a product made by the aforesaid process. The support structures are designed to be load bearing so as to prevent implosion of a planar, transparent face plate toward a parallel spaced-apart base plate when the space between the face plate and the base plate is sealed at the edges of the display to form a chamber, and the chamber is evacuated in the presence of atmospheric pressure outside the chamber. Unlike most spacer support structures proposed for such flat panel displays, the support structures are made from the same material as the substrate from which the face plate is fabricated. For a preferred embodiment of the process, a perforated laminar template is sealably sandwiched between a laminar silicate glass substrate and a manifold block to form a temporary sandwich assembly. The laminar template, preferably formed from a refractory ceramic or graphite material, is perforated with mold holes which are perpendicular to the major planar faces thereof, each hole corresponding to the desired location of a spacer support structure on the substrate. The manifold block has a plurality of mating ports, each such port mating with a major surface of the laminar template, and aligning with at least one mold hole of the template. Each of the mating ports is connected to a main vacuum port via a manifold formed from interconnecting grooves or passageways. After the substrate is heated evenly within a temperature range where the viscosity of the substrate material is greatly reduced, such that the material becomes plastic and readily flowable under pressure, pressure within the mold holes is reduced with respect to ambient pressure. The pressure differential causes the plastic substrate material will flow into the mold holes of the template.

34 Claims, 7 Drawing Sheets

U.S. PATENT DOCUMENTS

| | | |
|---|---|---|
| 1,146,910 | 7/1915 | Wiley et al. . |
| 2,950,569 | 8/1960 | Chapman . |
| 3,221,654 | 12/1965 | Jernt . |
| 3,608,143 | 9/1971 | Schutz . |
| 3,756,797 | 9/1973 | Akeyoshi et al. . |
| 4,710,337 | 12/1987 | Nordstrom . |
| 5,118,543 | 6/1992 | McColl . |
| 5,296,188 | 3/1994 | Lupke . |
| 5,888,112 | 3/1999 | Alwan . |
| 5,910,703 | 6/1999 | Kuo et al. . |

FOREIGN PATENT DOCUMENTS

| | | |
|---|---|---|
| 72296 | 3/1951 | (DK) . |
| 62-7532 | 1/1987 | (JP) . |
| 62-263020 | 11/1987 | (JP) . |
| 62-263021 | 11/1987 | (JP) . |
| 1-165420 | 6/1989 | (JP) . |
| 1-223909 | 9/1989 | (JP) . |

DIFFERENTIAL PRESSURE PROCESS FOR FABRICATING A FLAT-PANEL DISPLAY FACE PLATE WITH INTEGRAL SPACER SUPPORT STRUCTURES

CROSS-REFERENCE TO RELATED APPLICATION

This application is a continuation of application Ser. No. 08/795,752, filed Feb. 6, 1997, now U.S. Pat. No. 6,101,846, which issued on Aug. 15, 2000.

GOVERNMENT RIGHTS

This invention was made with government support under Contract No. DABT 63-93-C-0025 awarded by Advanced Research Projects Agency (ARPA). The Government has certain rights in this invention.

BACKGROUND OF THE INVENTION

1. Field of the Invention

This invention relates to evacuated flat panel displays such as those of the field emission cathode and plasma types and, more particularly, to the formation of spacer support structures for such a display, the support structures being used to prevent implosion of a transparent face plate toward a parallel spaced-apart back plate when the space between the face plate and the back plate is hermetically sealed at the edges of the display to form a chamber, and the pressure within the chamber is less than that of the ambient atmospheric pressure. The invention also applies to products made by such process.

2. Description of Related Art

For more than half a century, the cathode ray tube (CRT) has been the principal device for displaying visual information. Although CRTs have been endowed during that period with remarkable display characteristics in the areas of color, brightness, contrast and resolution, they have remained relatively bulky and power hungry. The advent of portable computers has created intense demand for displays which are lightweight, compact, and power efficient. Although liquid crystal displays (LCDs) are now used almost universally for laptop computers, contrast is poor in comparison to CRTs, only a limited range of viewing angles is possible, and battery life is still measured in hours rather than days. Power consumption for computers having a color LCD is even greater, and thus, operational times are shorter still, unless a heavier battery pack is incorporated into those machines. In addition, color screens tend to be far more costly than CRTs of equal screen size.

As a result of the drawbacks of liquid crystal display technology, field emission display technology has been receiving increasing attention by industry. Flat panel displays utilizing such technology employ a matrix-addressable array of cold, pointed, field emission cathodes in combination with a phosphor-luminescent screen.

Somewhat analogous to a cathode ray tube, individual field emission structures are sometimes referred to as vacuum microelectronic triodes. Each triode has the following elements: a cathode (emitter tip), a grid (also referred to as the gate), and an anode (typically, the phosphor-coated element to which emitted electrons are directed).

Although the phenomenon of field emission was discovered in the 1950's, only within the past ten years has research and development been directed at commercializing the technology. As of this date, low-power, high-resolution, high-contrast, full-color flat panel displays with a diagonal measurement of about 15 centimeters have been manufactured using field emission cathode array technology. Although useful for such applications as viewfinder displays in video cameras, their small size makes them unsuited for use as computer display screens.

In order for proper display operation, which requires field emission of electrons from the cathodes and acceleration of those electrons to the screen, an operational voltage differential between the cathode array and the screen of at least 1,000 volts is required. As the voltage differential increases, so does the life of the phosphor coating on the screen. Phosphor coatings on screens degrade as they are bombarded by electrons. The rate of degradation is proportional to the rate of impact. As fewer electron impacts are required to achieve a given intensity level at higher voltage differentials, phosphor life will be extended by increasing the operational voltage differential. In order to prevent shorting between the cathode array and screen, as well as to achieve distortion-free image resolution and uniform brightness over the entire expanse of the screen, highly uniform spacing between the cathode array and the screen must be maintained. During tests performed at Micron Display Technology, Inc. in Boise, Id., it was determined that, for a particular evacuated, flat-panel field emission display utilizing glass support columns to maintain a separation of 250 microns (about 0.010 inches), electrical breakdown occurred within a range of 1100–1400 volts. All other parameters remaining constant, breakdown voltage will rise as the separation between screen and cathode array is increased. However, maintaining uniform separation between the screen and the cathode array is complicated by the need to evacuate the cavity between the screen and the cathode array to a pressure of less than $10^{-6}$ torr so that the field emission cathodes will not experience rapid deterioration.

Small area displays (e.g. those which have a diagonal measurement of less than 3.0 cm) may be cantilevered from edge to edge, relying on the strength of a glass screen having a thickness of about 1.25 mm to maintain separation between screen and the cathode array without significant deflection in spite of the atmospheric load. However, as display size is increased, the weight of a cantilevered flat glass screen must increase exponentially. For example, a large rectangular television screen measuring 45.72 cm (18 in.) by 60.96 cm (24 in.) and having a diagonal measurement of 76.2 cm (30 in.), must support an atmospheric load of at least 28,149 newtons (6,350 lbs.) without significant deflection. A tempered glass screen or faceplate (as it is also called) having a thickness of at least 7.5 cm (about 3 inches) might well be required for such an application. But that is only half the problem. The cathode array structure must also withstand a like force without significant deflection. Although it is conceivable that a lighter screen could be manufactured so that it would have a slight curvature when not under stress, and be completely flat when subjected to a pressure differential, the fact that atmospheric pressure varies with altitude and as atmospheric conditions change such a solution becomes impractical.

A more satisfactory solution to cantilevered screens and cantilevered cathode array structures is the use of closely spaced dielectric support structures (also referred to herein as load-bearing spacers) each of which bears against both the screen and the cathode array plate, thus maintaining the two plates at a uniform distance between one another, in spite of the pressure differential between the evacuated chamber between the plates and the outside atmosphere. Such a structure makes possible the manufacture of large area displays with little or no increase in the thickness of the cathode array plate and the screen plate. It is interesting to note that a single cylindrical quartz column having a diameter of 25 microns (0.001 in.) and a height of 200 microns (0.008 in.) a buckle load of about $2.67\times10^{-2}$ newtons (0.006 lb.). Buckle loads are somewhat less if glass is substituted for quartz. Buckle loads also decrease as height is increased with no corresponding increase in diameter. It is also of note that a cylindrical column having a diameter d will have a buckle load that is only slightly greater than that of a column having a square cross section and a diagonal d. If quartz column support structures having a diameter of 25 microns and a height of 200 microns are to be used in the 76.2 cm diagonal display described above, slightly more than one million spacers will be required to support the atmospheric load. To provide an adequate safety margin that will tolerate foreseeable shock loads, that number would probably have to be doubled.

Load-bearing spacer support structures for field-emission cathode array displays must conform to certain parameters. The support structures must be sufficiently nonconductive to prevent catastrophic electrical breakdown between the cathode array and the anode (i.e., the screen). In addition to having sufficient mechanical strength to prevent the flat panel display from imploding under atmospheric pressure, they must also exhibit a high degree of dimensional stability under pressure. Furthermore, they must exhibit stability under electron bombardment, as electrons will be generated at each pixel location within the array. In addition, they must be capable of withstanding "bakeout" temperatures of about 400° C. that are likely to be used to create the high vacuum between the screen and the cathode array back plate of the display. Also, the material from which the spacers are made must not have volatile components which will sublimate or otherwise outgas under low pressure conditions. For optimum screen resolution, the spacer support structures must be nearly perfectly aligned to array topography, and must be of sufficiently small cross-sectional area so as not to be visible. Cylindrical spacers support structures must have diameters no greater than about 50 microns (about 0.002 inch) if they are not to be readily visible.

There are a number of drawbacks associated with certain types of spacer support structures which have been proposed for use in field emission cathode array type displays. Support structures formed by screen or stencil printing techniques, as well as those formed from glass balls lack a sufficiently high aspect ratio. In other words, spacer support structures formed by these techniques must either be so thick that they interfere with display resolution, or so short that they provide inadequate panel separation for the applied voltage differential. A process of forming spacer support structures by masking and etching deposited dielectric layers in a reactive-ion or plasma environment to a depth of at least 250 microns suffers not only the problem of slow manufacturing throughput, but also that of mask degradation, which will result in the spacer support structures having non-uniform cross-sectional area throughout their lengths. Likewise, spacer support structures formed from lithographically defined photoactive organic compounds are totally unsuitable for the application, as they tend to deform under pressure and to volatize under both high-temperature and low-pressure conditions. Techniques which adhere stick shaped spacers to a matrix of adhesive dots deposited at appropriate locations on the cathode array back plate are typically unable to achieve sufficiently accurate alignment to prevent display resolution degradation, and any misaligned stick which is adhered to only the periphery of an adhesive dot may later become detached from the dot and fall on top of a group of nearby cathode emitters, thus blocking their emitted electrons.

What is needed is a new method of manufacturing dielectric, load-bearing spacer support structures for use in field emission cathode array type displays. The resulting support structures must have high aspect ratios, near-perfect alignment on both the screen and backplate, resist deformation under pressure and be compatible with very low pressure and high temperature conditions.

BRIEF SUMMARY OF THE INVENTION

The present invention includes a process for fabricating a face plate assembly for a flat panel evacuated display. The process includes the steps of: providing a generally laminar glass substrate; providing a generally laminar template having at least one major planar face and an array of mold holes which open to the major face, each mold hole corresponding to a desired location of a spacer support structure; sealably positioning the substrate against the major face; heating the substrate to a temperature where the glass substrate becomes flowable; creating a pressure differential between an ambient pressure and a pressure within the mold holes, the pressure within the mold holes being less than that of the ambient atmosphere, the pressure differential causing each of the mold holes to fill with flowable material from the substrate.

The invention also includes an apparatus for forming a face plate assembly using the aforestated process. The apparatus includes a laminar template having first and second major planar faces and an array of mold holes perpendicular to the major faces, with each mold hole corresponding to a desired location of a spacer support structure on the laminar face plate; a manifold block having at least one generally planar surface sealably positionable against the first major planar face, the manifold block also having an array of mating ports on its planar surface, each such port mating with an adjacent major surface of the template and aligning with at least one mold hole in the template; and vacuum or pressurization equipment, or both, for creating a pressure differential between the ambient atmosphere which surrounds the temporary structure the pressure prevailing within the mold holes when a generally laminar substrate is sealably positioned in contact with the second major planar face, such that the pressure within the mold holes is less than that of the ambient atmosphere, the pressure differential causing each of the mold holes to fill with material from the substrate as the sealably-positioned substrate becomes plastic at the prevailing pressure conditions when heated.

The invention also includes a flat-panel evacuated display having a face plate assembly characterized by a glass laminar face plate having spacer support structures which protrude from the laminar face plate, with the spacer support structures being formed from glass material that is continuous with that from which the laminar face plate is formed.

The invention also includes an evacuated flat panel display having a face plate assembly manufactured by the aforestated process.

DETAILED DESCRIPTION OF THE INVENTION

The present invention includes a process for fabricating a one-piece face plate assembly for an evacuated flat-panel display The face plate assembly so fabricated may be characterized as having a transparent glass laminar face plate with spacer support structures protruding from the laminar face plate. Each of the spacer support structures is formed from glass material that is continuous with that from which the laminar face plate is formed. The support structures are designed to be load bearing so as to prevent implosion of the face plate toward a parallel spaced-apart base plate when the space between the face plate and the base plate is sealed at the edges of the display to form a chamber, and the chamber is evacuated in the presence of atmospheric pressure outside the chamber.

The differential pressure method for fabricating a face plate and spacer assembly for a field emission flat panel display will now be described with reference to FIGS. 1 through 6. It should be kept in mind that the drawings are not to scale, and that they are merely illustrative of the process and the product formed by that process.

Figure 1:
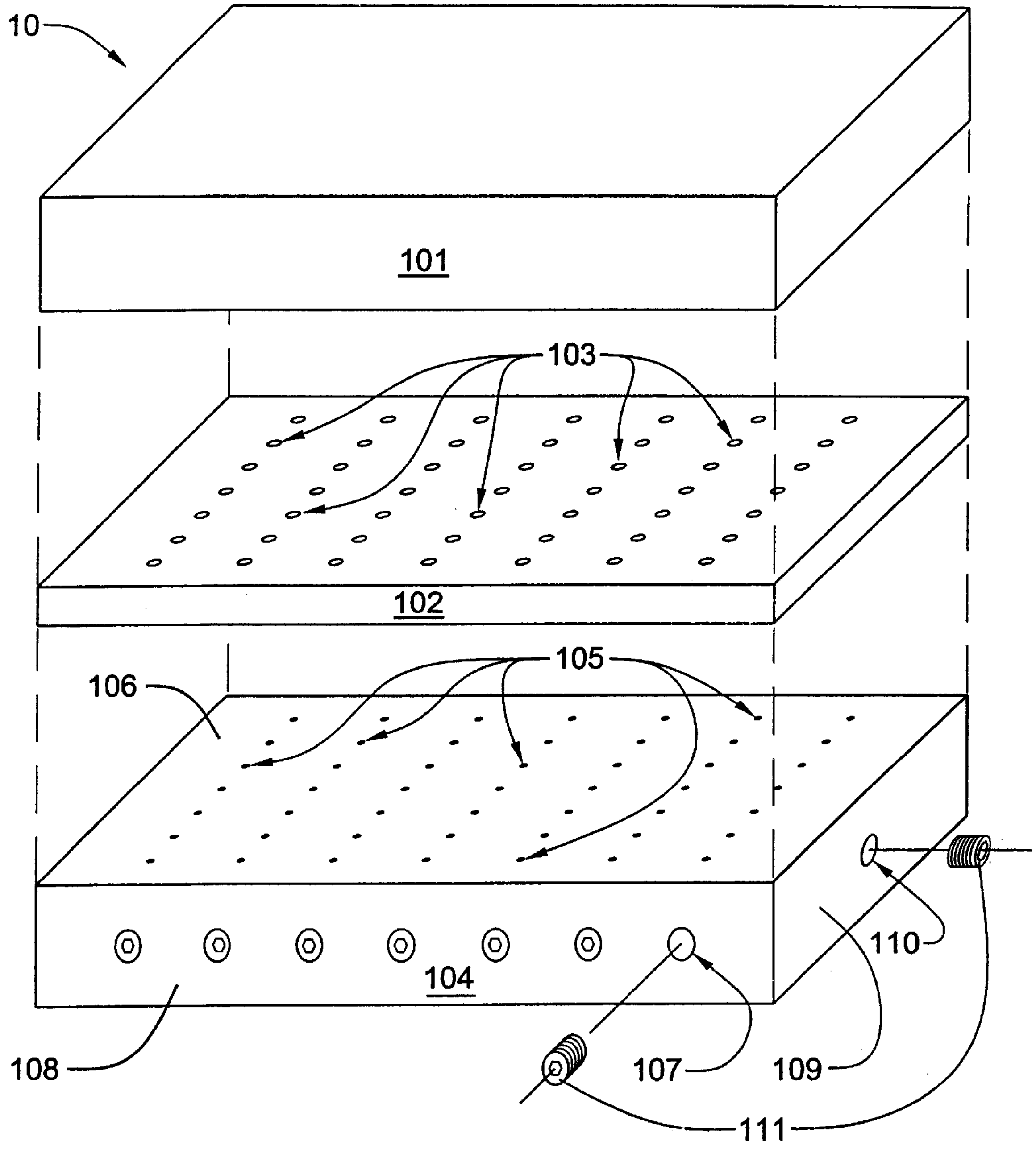
FIG. 1 is an isometric view of an exploded temporary sandwich assembly, which includes a solid, laminar silicate glass substrate, a template having a plurality of perforations, and manifold having a circular mating port for each template hole and bore holes interconnecting the mating ports.

Referring now to FIG. 1, a temporary sandwich assembly (shown herein as an exploded view) 10 is constructed from a solid laminar substrate 101; such as a sheet of silicate glass, which becomes plastic at elevated temperature; a template 102 having an array of mold holes 103; and a manifold 204 having an array of mating ports 105 which align with the mold holes 103 if the template. The template 102, which may be formed, for example, by micro machining or laser machining from graphite, a ceramic material, or a metal alloy having a melting point greater than 1000° C. The material from which the template 102 is formed should, preferably, also have a coefficient of expansion identical or nearly identical to that of the substrate 101, at least throughout the range of substrate heating and cooling required for the vacuum molding operation This is because after plastic material from the heater substrate 101 is forced into the mold holes 103 by a pressure differential, it may be described to allow the material in the mold hokes 103 to solidify somewhat before the template is removed. If the coefficients of expansion are much different, the material in the mold holes 103 might be sheared from the substrate as cooling occurs. The axis of each mold hole 103 within the template 102 is perpendicular to the major surfaces of the template. However, as will be subsequently explained, each mold hole may be tapered to facilitate removal of the template from a completed face plate assembly. The maifold 104 may be, for example, a rectangular block of durable material, such as a steel or titanium alloy or ceramic, which as a melting point greater than 1000° C and a coefficient of expansion identical or nearly identical to that of the template 102. The manifold 104 has a smooth upper major surface 106 through which each of the mating ports 105 is bored, machined, or otherwise formed. A network of passageways internal to the manifold 104 may be formed, for example, by forming a plurality of parallel, equiplanar bore holes 107 which are perpendicular to a first edge 108 of the rectangular block from which the manifold 104 is formed. At least one interconnecting perpendicular bore hole 110 is formed perpendicular to a second edge 109. Each of the bore holes may be sealed at its opening with a plug 111. Each of the mating ports 105 interconnects with the network of passageways. The network is coupled to a single cacuum port (not shown in this figure, but shown in FIG. 4 as item 401). The mating ports 105 are of smaller diameter than the mold holes within the template 102. A preferred ratio of mold hole diameter to mating port diameter is about 2:1.

Figure 2:
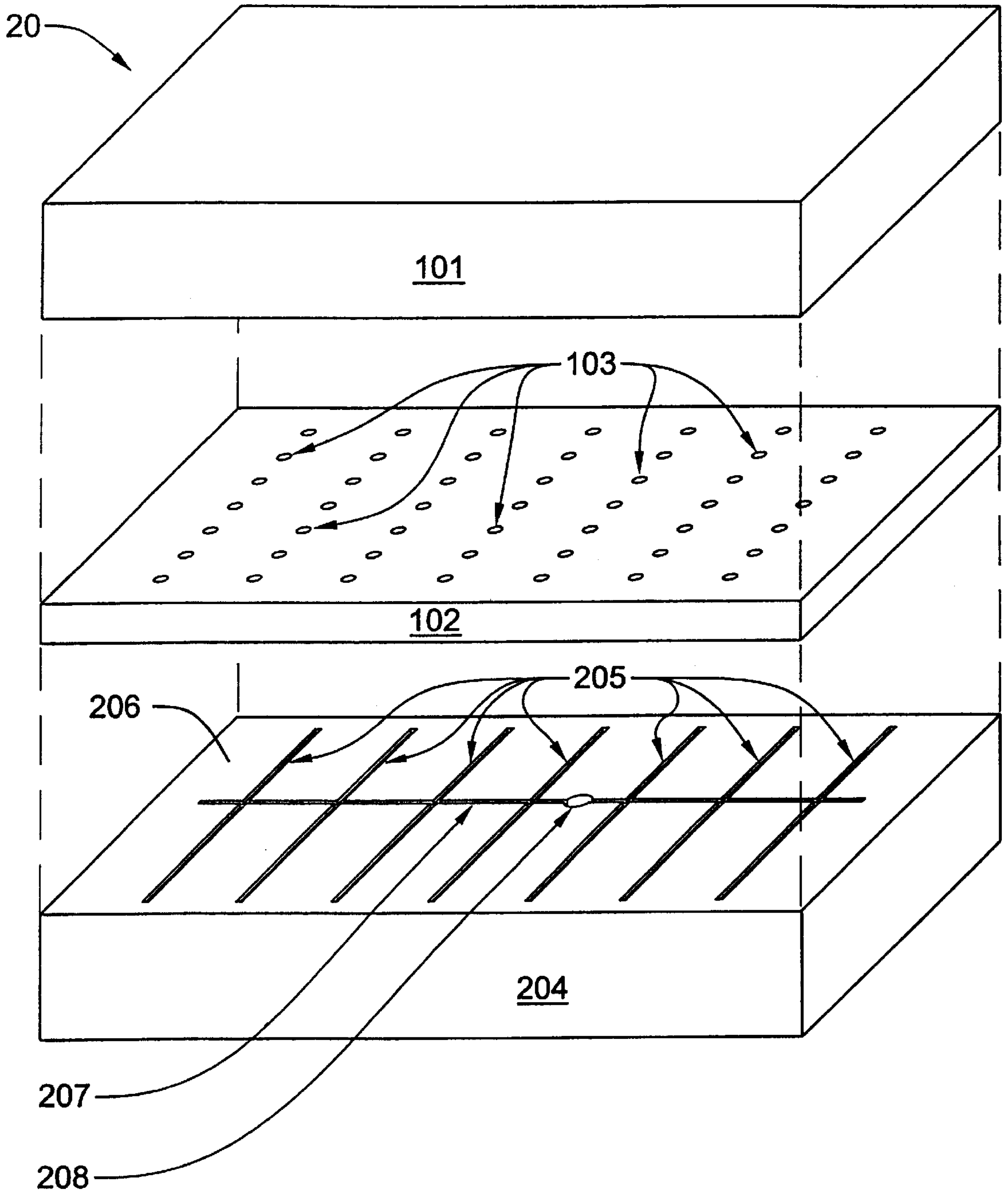
FIG. 2 is an isometric view of an exploded temporary sandwich assembly similar to that of FIG. 1, but with a manifold having grooved mating ports.
Figure 3:
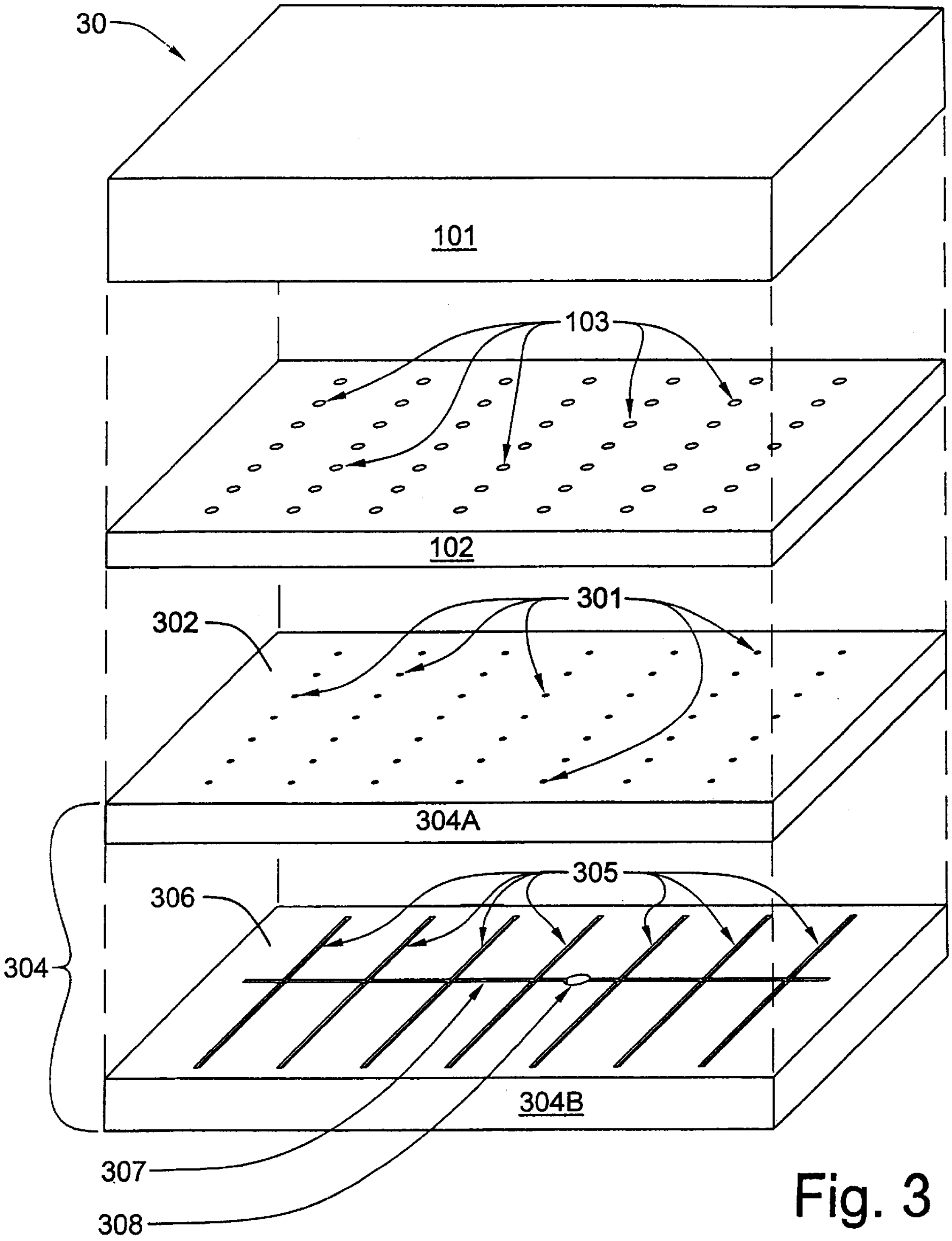
FIG. 3 is an isometric view of an exploded temporary sandwich assembly similar to that of FIG. 1, but with a two piece manifold having first plate with a circular mating port for each template hole and a grooved second plate.

FIGS. 2 and 3 depict alternate embodiments for the temporary sandwich assembly of FIG. 1, with the differences being limited to the design of the manifold block component. These alternate embodiments will be described in detail after a description is given of FIGS. 4 through 9.

Figure 4:
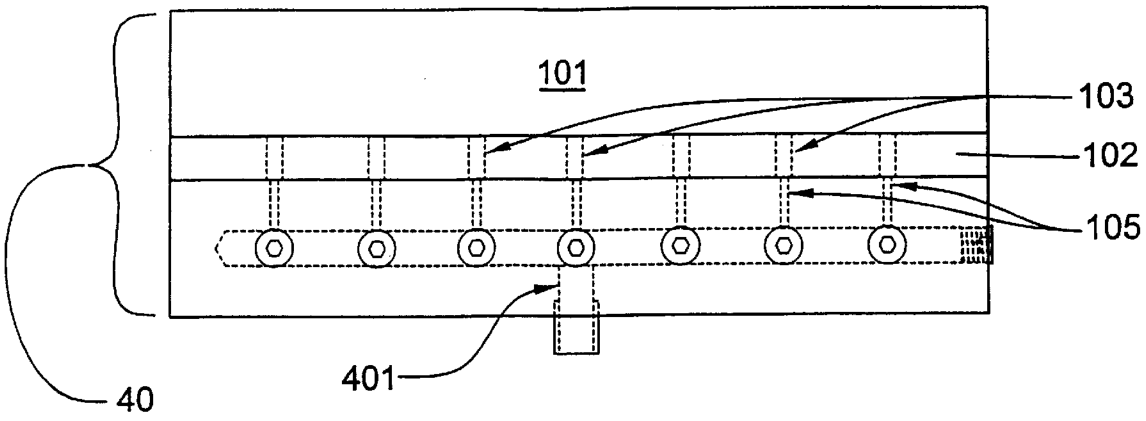
FIG. 4 is a side elevational view of the temporary sandwich assembly.

Referring now to FIG. 4, the three components of the temporary sandwich assembly 10 are shown as a single unit 40, with the template 102 being sealably fitted between the overlying substrate 101 and the underlying manifold 104. The vacuum port 401 is visible in this view. It will be noted that each mating port 105 of manifold 104 is aligned with an associated mold hole 103 of the template 102. The more planar the mating surfaces of the components of the temporary sandwich assembly 10, the better the sealing between them. As long as the capacity of an evacuation system to be connected to the vacuum port 401 is at least, for example, an order of magnitude greater than any leakage between the mating surfaces of the components, no special sealing provision need be taken at the edges of the sandwich assembly 10.

Figure 5:
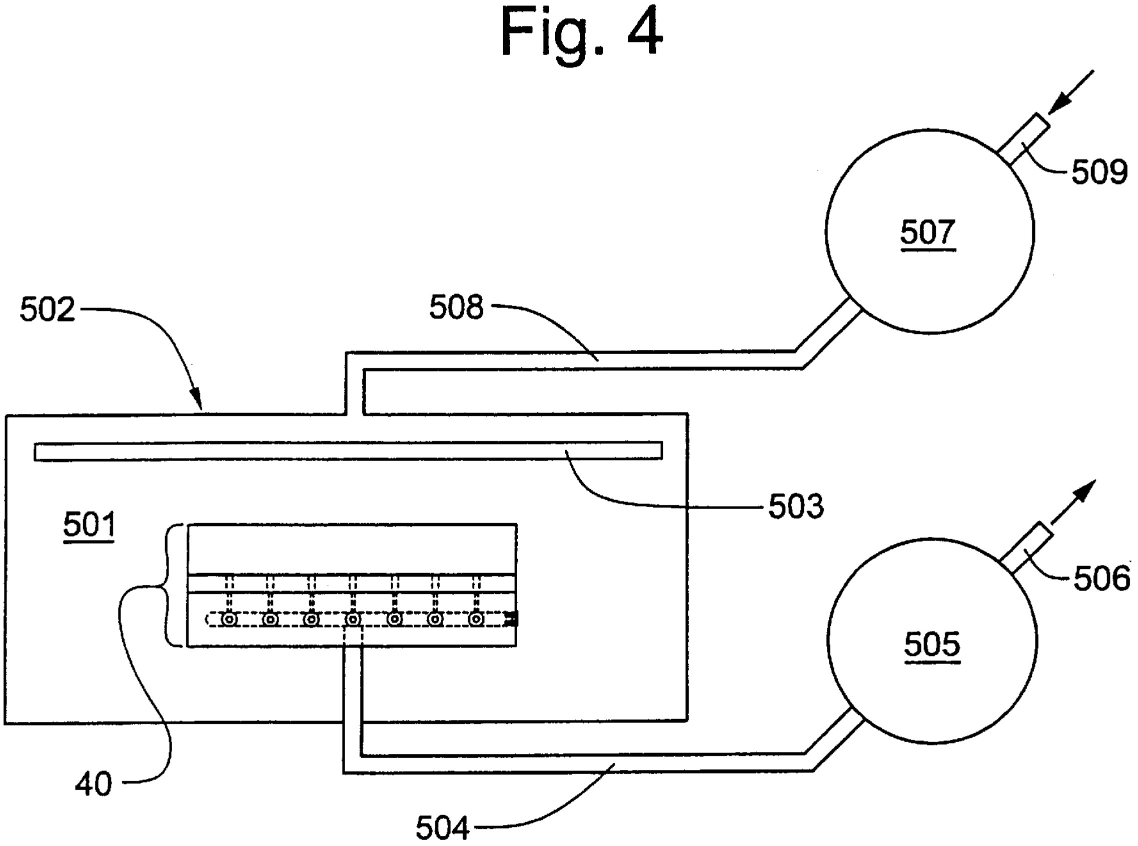
FIG. 5 is a side elevational view of the temporary sandwich assembly connected to a vacuum pump and shown within an oven chamber that is connected to a compressor.

Referring now to FIG. 5, the temporary sandwich assembly unit 40 of FIG. 4 is shown mounted within the chamber 501 of an oven 502. The oven has a heating element array 503 which is used to heat the temporary sandwich assembly unit 40. The vacuum port 401 is connected via a vacuum line 504 to a vacuum pump 505, which has an exhaust port 506. The oven is also shown as being connected to an optional compressor 507 via a pressure line 508. In the event that the compressor 507, which has an intake port 509 is employed to pressurize the oven chamber 501, the oven chamber 501 must be hermetically sealable.

Still referring to FIG. 5, the process for forming a faceplate assembly having integral spacer support structures proceeds as follows. The assembled temporary sandwich assembly 40 is heated within the oven chamber 501. When the substrate is evenly heated within a temperature range of about 600° C. to 1,000° C. where the substrate material has become much less viscous and will flow easily under pressure, a partial vacuum is applied to the vacuum port 401. The laminar substrate 101 will begin to deform as substrate material flows into the mold holes 103 of the template 102 as a consequence of the pressure differential within the mold holes 103 and the oven chamber ambiance. A pressure differential may be created using the depicted apparatus in three ways. The first is to apply a partial vacuum to the main vacuum port 401 in the presence of atmospheric pressure within the oven chamber 501. The second is to pressurize the oven chamber 501 above atmospheric pressure and allow the pressure within the manifold and mold holes to remain at atmospheric pressure. The third way is to apply a partial vacuum to the main vacuum port 401 and simultaneously pressurize the oven chamber 501. The third way provides the most rapid spacer formation, as the pressure differential may be greater than 1 atmosphere. When the mold holes 103 in template 102 are completely filled, flow of plastic substrate material slows greatly because of the increased difficulty of the highly viscous material flowing through the much smaller mating ports 105 in the manifold block 104. For a preferred embodiment of the process, it will be remembered that the mating ports 105 have a diameter of about half that of the mold holes 103. Thus, cross-sectional area of the mating ports 105 is about one-fourth that of the mold holes 103. Such a feature provides an opportunity for all spacer support structures to achieve uniform height in spite of slight variations in temperature and pressure differential experienced by various portions of the substrate 101, as flow rate of substrate material into the mating ports will be dramatically reduced because of the restricted diameter.

Figure 6:
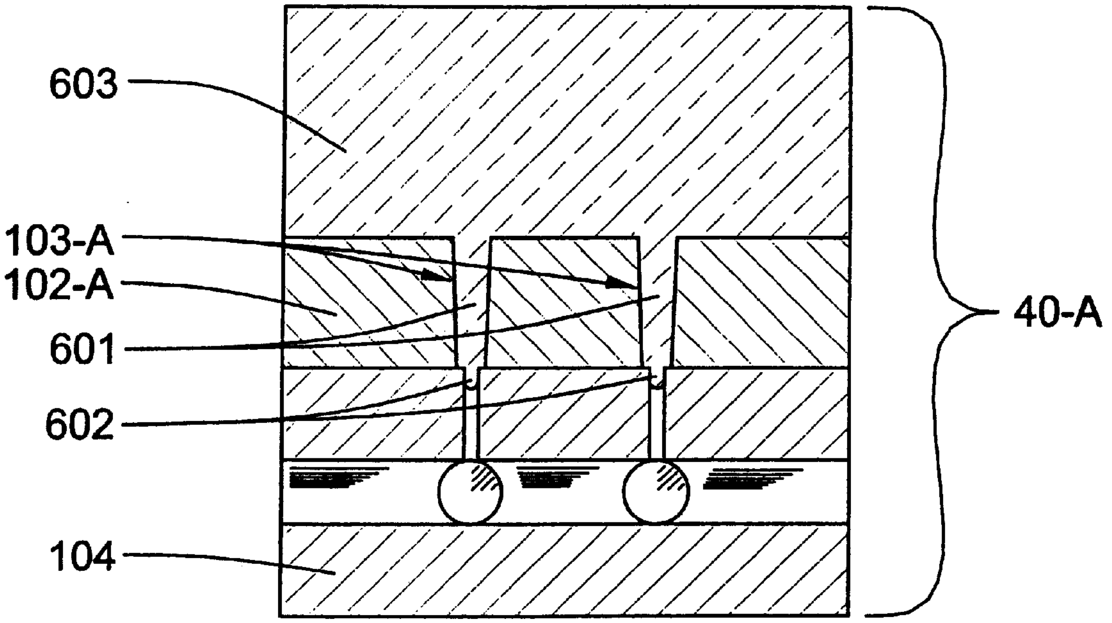
FIG. 6 is a cross-sectional view taken through the sandwich showing a close-up view of a template having tapered holes.

One of the problems associated with the process is that of removal of the spacer columns from the mold holes 103 without breaking them off at the base. The problem may be solved in at least two different ways. One way is to form spacer columns which are slightly tapered so that frictional forces will not impede removal. For such an embodiment of the faceplate assembly, each of the spacer columns is tapered so that the end of each is of slightly smaller diameter than the base thereof. In one variant of the preferred embodiment process, the holes in the template are tapered so that the template may be separated from the integrated substrate and spacer structure without breaking the spacer support structures at their bases. For spacers with a circular cross section that have a height of 625 microns (about 0.025 inch), a mere 1 degree taper will result in a loss of approximately 22 microns from base to top. Thus, a spacer having a diameter of 50 microns (about 0.002 inch) at its base will lose nearly half of that diameter near the tip. Thus, for high-aspect-ratio spacer support structures, the range of taper angles must be restricted to not much more than 1 degree if resolution of the display is not to be impaired. FIG. 6, which is a close-up cross-sectional view taken through a small portion of the temporary sandwich assembly unit 40-A at the location of a pair of tapered spacer columns 601, more accurately depicts closer to actual scale, the shape of such a spacer column within a tapered mold hole 103-A in template 102-A. It will be noted that each spacer column 601 has a stub flashing 602 at the end thereof. Once the manifold 104 is removed from temporary structure 40-A, the stub flashings may be polished off using, for example, a chemical-mechanical polishing process so that the top of each spacer support column is even with the template surface.

Figure 7:
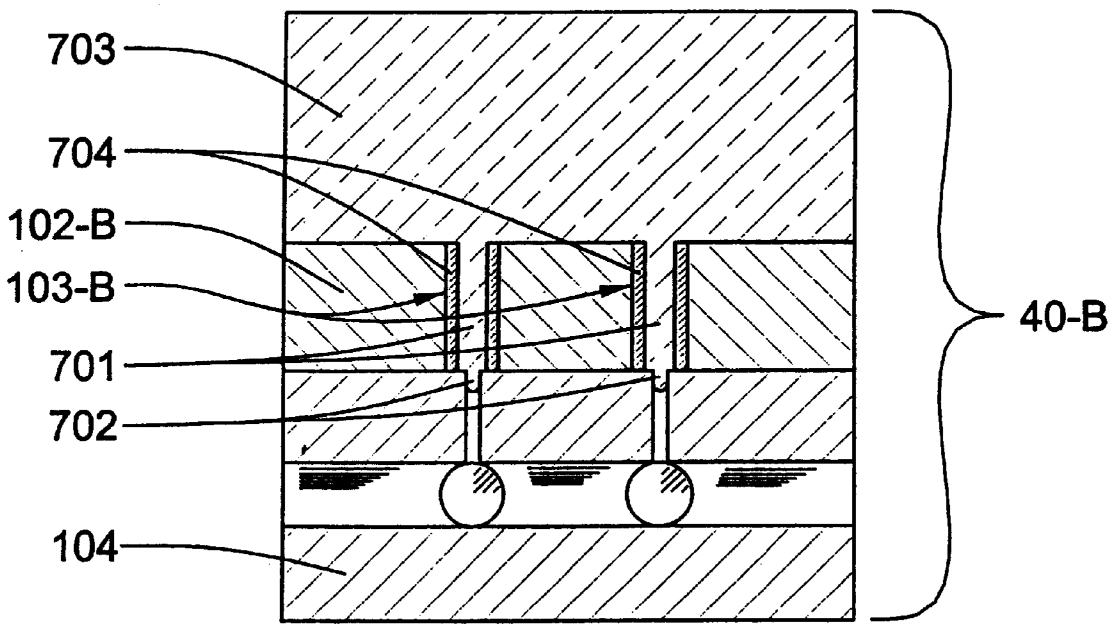
FIG. 7 is a cross-sectional view taken through the sandwich showing a close-up view of a template having plated or coated holes of constant diameter.

A second way to facilitate removal of the spacer columns from the mold holes in the template is to coat the walls of the mold holes with a mold release layer which can be removed after the spacer columns are formed. This method is most useful with support columns having such a high aspect ratio (i.e., a high ratio of length to width at the base) that tapering them will result in an unacceptably fragile or nonexistent upper portion. FIG. 7, which is a close-up cross-sectional view taken through a temporary sandwich assembly unit 40-B at the location of a pair of spacer columns more accurately depicts to actual scale, the shape of a spacer column of uniform diameter throughout its length, which relies on the removal of such a lining or plating layer within the mold holes for release of the spacer support structures from the mold holes. For this particular application, the mold holes 103-B in the template 102-B are of larger diameter than the required spacer support structures 701. Before the substrate 101, the template 102-B and the manifold block 104 are assembled as a unit, a mold release layer 704 is deposited or plated on the walls of the mold holes 103-B. The mold release layer 704 is a material such as silicon nitride, which can be etched selectively with respect to both the substrate material and the material from which the template is formed. After the spacer support structures 701 are formed within the lined or plated mold holes 103-B, the mold release layer 704 within the mold holes 103-B is etched away so that the template may be easily separated from the substrate and the spacer support structures which are integral thereto. As with the tapered spacers of FIG. 6, it will be noted that the spacer column 701 has a stub flashing 702 at the end thereof. Once the manifold 104 is removed from temporary structure 40-B, the stub flashings 702 may be polished off using, for example, a chemical-mechanical polishing process so that the top of each spacer support column is even with the template surface.

Figure 8:
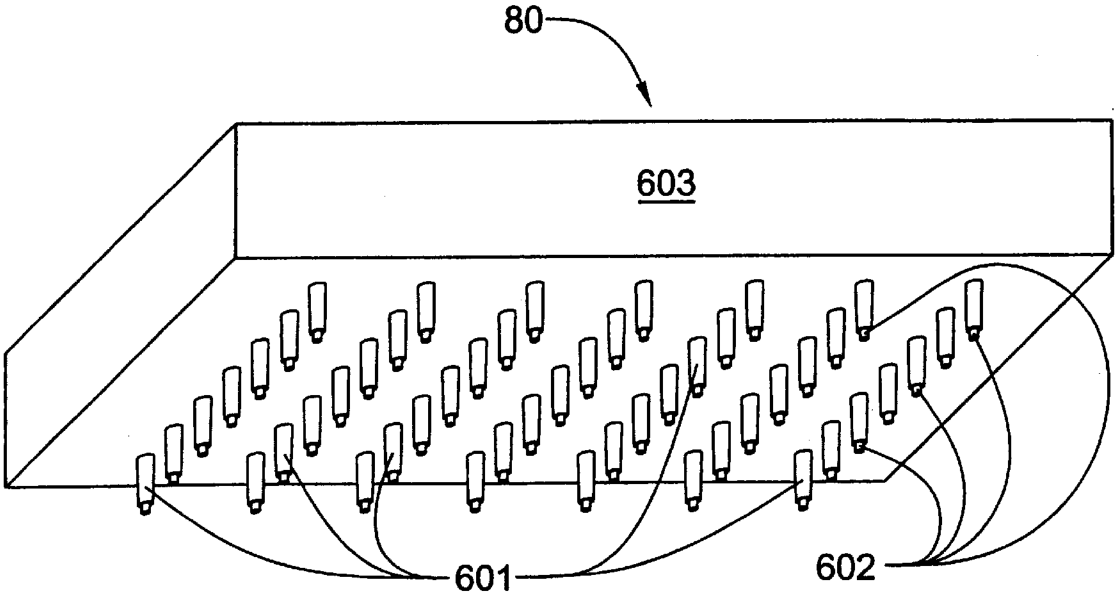
FIG. 8 is a face plate following the vacuum forming process, but prior to removing the excess flashing material at the top of each support column.

FIG. 8 depicts the faceplate assembly 80, as it would appear while still a part of the temporary sandwich assembly unit 40-A of the type described in FIG. 6 if the template 102-A and the manifold block 104 were transparent. It will be observed that each spacer column 601 attached to face plate 603 is tapered to facilitate removal of the spacer columns 601 from the template 102-A. A length of stub flashing 602 is visible on each spacer column 601. Once the manifold 104 is removed from temporary structure 40-A, the stub flashings may be polished off, as heretofore explained, so that the top of each spacer support column is even with the template surface.

Figure 9:
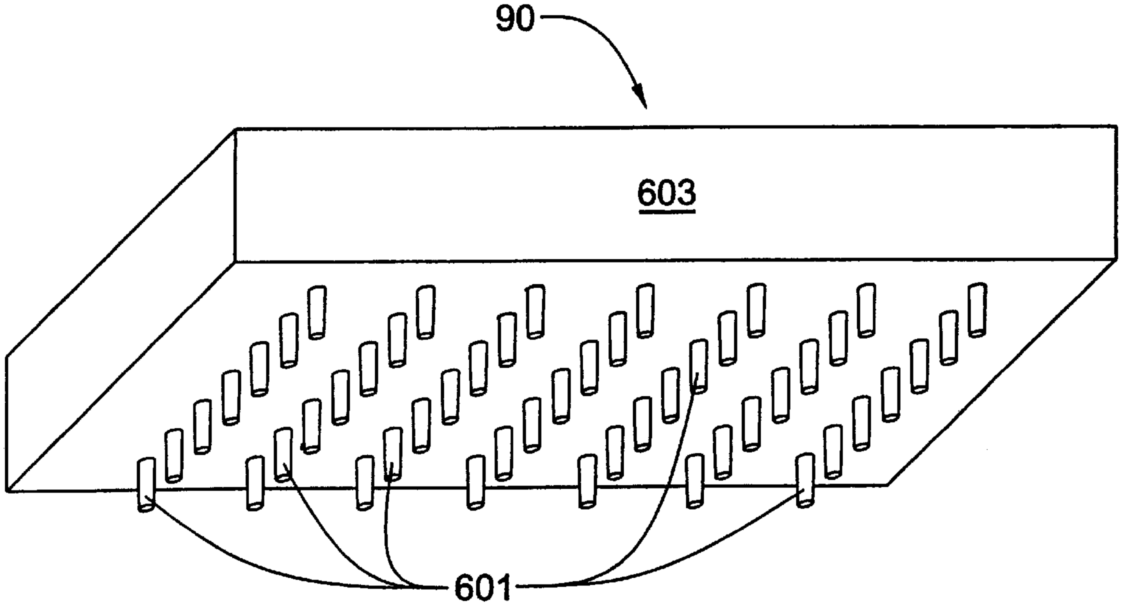
FIG. 9 is the face plate of FIG. 4 after the excess material has been removed.

Referring now to FIG. 9, a face plate assembly 90 is the same face plate assembly as that depicted in FIG. 8, but after each flashing stub has been removed from its respective spacer column 601.

Referring now to the FIG. 2, the temporary sandwich assembly 20 is similar to that of FIG. 1, with the exception of the manifold 204. Although the manifold 204 of this embodiment also has a major planar surface 206, the mating ports of manifold 204 are a series of parallel rectilinear grooves 205 which are intersected by another rectilinear groove 207. The vacuum port 208 is visible in this drawing. Each of the rectilinear grooves 205 which functions as a mating port for multiple template mold holes 103 is narrower in width than the diameter of the mold holes 103.

Referring now to FIG. 3, the temporary sandwich assembly 30 is similar to that of FIG. 1, with the exception of the manifold 304. Manifold 304 includes two pieces: a first manifold plate 304A, which is perforated with a plurality of mating ports 301 on a major surface 302, each of which mates to a single mold hole 103; and a second manifold plate 304B which includes a series of rectilinear grooves 305, which pneumatically interconnect the mating ports 301, and a single intersecting rectilinear groove 307, which pneumatically interconnects the series of rectilinear grooves 305 to a vacuum port 308. A major surface 306 of second manifold plate 304B sealably mates with an underlying major surface (not shown) of first manifold plate 304A.

Figure 10:
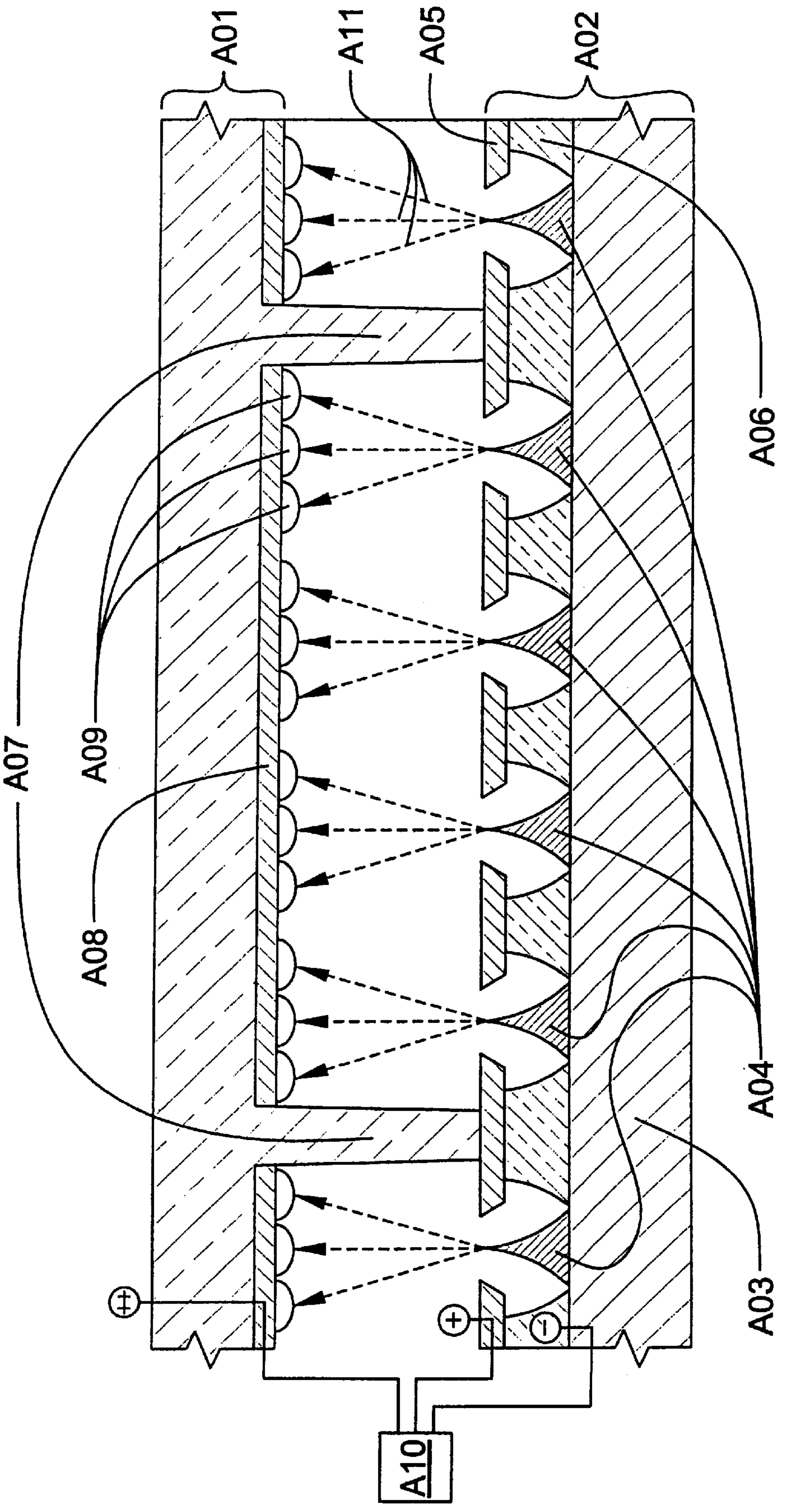
FIG. 10 is a cross-sectional view of a small portion of a field emission display having a face plate and spacer assembly fabricated in accordance with the present invention.

Referring now to FIG. 10, a portion of a field emission flat panel display which incorporates a face plate assembly having integral spacer support structures formed by the above described process is depicted. The display includes a face plate/spacer assembly A01 and a representative base plate assembly A02. For this particular display, the base plate assembly A02 is formed by depositing a conductive layer such as silicon on top of a glass substrate A03. The conductive layer is then etched to form individual conically-shaped micro cathodes A04, each of which serves as a field emission site on the glass substrate A03. Each micro cathode A04 is located within a radially symmetrical aperture formed by etching, first, through an upper conductive gate layer A05, and, then, through a lower insulating layer A06. The face plate A01 is supported by integral dielectric spacer support structures A07 (those of the tapered type are depicted here), which contact the upper gate layer. The face plate is coated with a transparent, conductive layer such as indium tin oxide A08, on which phosphor dots A09 are deposited through one of many known printing techniques (e.g., screen printing, ink jet). When a voltage differential, generated by voltage source A10, is applied between a micro cathode A04 and its associated surrounding gate aperture in gate layer A05, a stream of electrons A11 is emitted toward the phosphor dots on the face plate A01 which are above the emitting micro cathode A04. The screen, which is charged to a potential that is even higher than the gate layer A05, functions as an anode by causing the emitted electrons to accelerate toward it. The micro cathodes A04 are matrix addressable via circuitry within the base plate (not shown) and, thus, can be selectively activated in order to display a desired image on the phosphor-coated screen.

More detailed information regarding the manufacture of a base plate assembly for field emission displays can be found in U.S. Pat. No. 5,229,331 entitled METHOD TO FORM SELF-ALIGNED GATE STRUCTURES AROUND COLD CATHODE EMITTER TIPS USING CHEMICAL MECHANICAL POLISHING TECHNOLOGY and in U.S. Pat. No. 5,372,973, which is a continuation of the former. Both of these patents are hereby incorporated in this document by reference.

The invention also includes a field emission display having a face plate and spacer support structures which are formed from a single piece of material. For a preferred embodiment of such a display, the face plate and the spacer support structures are made of silicate glass. As heretofore disclosed, for one embodiment of the face plate, the spacer support structures are tapered slightly in order to facilitate removal of the spacer support structures from the template after they are formed under heat and pressure in accordance with the process described above For another embodiment of the face plate, the spacer support structures are columnar and have a constant diameter throughout their length.

It should be readily apparent from the above descriptions, that the heretofore described process is capable of forming a face plate for internally evacuated flat panel displays which have spacer support structures which are integral with the face plate. Face plates having integral spacer support structures may be efficiently and accurately manufactured via this process.

Although only several embodiments of the process, the product derived by the process, and an apparatus for performing the process are disclosed herein, it will be obvious to those having ordinary skill in the art that changes and modifications may be made thereto without departing from the scope and the spirit of the process and product by the process as hereinafter claimed. For example, although only columnar spacer support structures are depicted in this disclosure, the process should not be considered limited to the fabrication of spacer support structures in the shape of straight or tapered columns. Spacer support structures having any cross-sectional shape, such as crosses and walls are also contemplated within the scope of the invention.

What is claimed is:

1. A method of fabricating a face plate assembly for a flat panel display having laminar silicate glass sheet comprising:

providing a template having an array of mold holes open to a first planar surface, each mold hole of the array of mold holes corresponding to a desired location and a desired shape of a spacer support structure;

positioning the laminar silicate glass sheet in contact with the first planar surface of the template;

heating the laminar silicate glass sheet to a temperature where the laminar silicate glass sheet becomes flowable under pressure, creating a pressure differential between an ambient pressure and a pressure within the array of mold holes of the template, the pressure within the array of mold holes of the template being less than that of the ambient atmosphere pressure, the pressure differential causing glass to be displaced from the laminar silicate glass sheet and fill at least one mold hole of the array of mold holes of the template forming at least one spacer support structure;

removing the laminar silicate glass sheet having attached the at least one spacer support structure from the template;

coating a surface of the laminar silicate glass sheet to which the attached at least one spacer support structure with a transparent layer of conductive material; and depositing at least one phosphor dot on the transparent layer of conductive material.

2. The method of claim 1, which, prior to removing the laminar silicate glass sheet from the template, further comprises:

cooling the laminar silicate glass sheet and the attached at least one spacer support structure to a temperature at which the laminar silicate glass sheet from which they are formed no longer flows at prevailing pressure conditions.

3. The method of claim 1, further comprising:

coupling at least one mold hole of the array of mold holes of the template to a vacuum pump.

4. The method of claim 3, wherein said template includes a second planar surface substantially parallel to and interconnected with said first planar surface via at least one mold hole each of said mold holes of the array of mold holes extending between said first planar surface and said second planar surfaces.

5. The method of claim 1, wherein the transparent layer is of conductive material is indium tin oxide.

6. The method of claim 4, further comprising:

a manifold block having at least one mating port aligned with a mold hole of the array of mold holes of the template, the at least one mating port having a cross-sectional area size less than the cross-sectional area size of an aligned mold hole of the array of mold holes of the template.

7. The method of claim 4, further comprising:

removing flashing material from portions of spacers, said flashing material being integral with the at least one spacer support structure.

8. The method of claim 7, wherein the flashing material is removed by a polishing step.

9. The method of claim 1, wherein the heating of the laminar silicate glass sheet includes heating the laminar silicate glass sheet within an over chamber.

10. The method of claim 9, wherein the oven chamber includes a hermetically sealable and pressurizable oven chamber.

11. The method of claim 10, wherein the oven chamber includes a compressor pump connected thereto.

12. The method of claim 1, wherein each mold hole of the array of mold holes of the template comprises a tapered mold hole to facilitate separation of the face plate assembly from the template.

13. The method of claim 12, wherein said each mold hole of the array of mold holes is tapered within a range of about 0.5 to 2 degrees from normal to the first planar surface of the template.

14. The method of claim 1, wherein each said mold hole of the array of mold holes including a lining, the lining comprising a layer that is selectively etchable with respect to the laminar silicate glass sheet and the template.

15. The method of claim 1, wherein both the laminar silicate glass sheet and the template are heated and cooled simultaneously.

16. The method of claim 15, wherein the laminar silicate glass sheet is heated to a temperature within a range of 600°C to about 1000°C.

17. The method of claim 1, wherein said template is formed from a group of materials consisting of ceramic compounds, metals and metal alloys having a melting point greater than 1000°C, and graphite.

18. The method of claim 4, further comprising:

providing a manifold block having a third major planar surface and a plurality of ports, each port of said plurality of ports forming an opening on said third major planar surface, said each port of said plurality of ports coinciding with a mold hole of said array of mold holes when said third major planar surface is mated to said second major planar surface of said template, and said each port of said plurality of ports being connected to said vacuum pump.

19. A method of fabricating a face plate assembly for a flat panel evacuated display, the assembly having a laminar face plate structure and integral spacer support structures formed of substantially a same material as that of the laminar face plate structure comprising:

providing a generally laminar glass substrate having a first planar surface and second planar surface;

providing a generally laminar template having a first planar face and a second planar face and having an array of mold holes perpendicular to the first planar and second planar face, each mold hole of the array of mold holes corresponding to a desired location of a spacer support structure;

providing a manifold block having at least one generally planar surface and an array of mating ports on said at least one generally planar surface, each such port of the array of mating ports mating with an adjacent surface of said generally laminar template and aligning with at least one mold hole of the array of mold holes in said generally laminar template;

forming a temporary generally sealed structured by sandwiching said generally laminar template between the first planar surface of said generally laminar glass substrate and the at least one generally planar surface of said manifold block;

heating said laminar glass substrate to a plastic state at predetermined pressure conditions;

creating a pressure differential between an ambient atmosphere surrounding the temporary generally sealed structure and pressure within the array of mold holes, the pressure withint the array of mold holes being less than that of the ambient atmosphere, the pressure differential causing glass material from the generally laminar glass substrate to flow into and fill said each mold hole of the array of hold holes;

removing the face plate assembly from the generally laminar template;

coating said first planar surface with a transparent layer of conductive material; and depositing phosphor dots on the transparent layer of conductive material.

20. The method of claim 19, which, prior to the removing the face plate assembly from the generally laminar template which, prior to the step of removing the face plate assembly from the template further comprising:

cooling the generally laminar glass substrate and the glass material within said each mold hole of the array of mold holes below a temperature at which the generally laminar glass substrate is formed and which has flowed into said each mold hole of the array of mold holes.

21. The method of claim 19, wherein said each mold hole of the array of mold holes is restricted at one and thereof by a mating port of the array of mating ports of the manifold block.

22. The method of claim 19, further comprising:

removing flashing material from a portion of at least one spacer support structure of the integral spacer support structures that is most distant from the laminar face plate structure.

23. The method of claim 19, wherein said pressure differential is created by applying a partial vacuum to said each mold hole of the array of the mold holes via a mating port aligned thereto.

24. The method of claim 19, wherein the heating of the generally laminar glass substrate and the generally laminar template includes heating within an oven chamber.

25. The method of claim 24, wherein the oven chamber includes a hermetically sealable and pressurizable oven chamber.

26. The method of claim 25, wherein the oven chamber includes a compressor pump connected thereto.

27. The method of claim 19, wherein said array of mating ports are interconnected by the manifold block to a vacuum port connected to a vacuum pump.

28. The method of claim 19, wherein said each mold hole of the array of mold holes is tapered to facilitate separation of the face plate assembly from the generally laminar template.

29. The method of claim 19, wherein said each mold of the array of nold holes is tapered about 0.5 to 2.0 degrees from normal to the first and second planar face of the generally laminar template.

30. The method of claim 19, wherein said each mold hole of the array of mold holes includes a layer as a lining that is selectively etchable with respect to the generally laminar glass substrate and the generally laminar template.

31. The method of claim 19, wherein the generally laminar glass substrate is silicate glass.

32. The method of claim 31, wherein the generally laminar glass substrate and the generally laminar template are heated to a temperature within a range of 600° C to 1000°C.

33. The method of claim 19, wherein said generally laminar template is formed from at least one material selected from a group of materials consisting of ceramic compounds, metals and metal alloys having a melting point greater than 1000°C, and graphite.

34. The method of claim 19, wherein said manifold block includes:

a manifold block having a third major planar surface and a plurality of ports, each port of said plurality of port includes a groove forming an opening on said third major planar surface, said each of plurality of ports positioned to alin with multiple mold holes of the array of mold holes when said third major planar surface is mated to said second planar surface, and said each of said plurality of ports being connected to a vacuum pump.

* * * * *

UNITED STATES PATENT AND TRADEMARK OFFICE

CERTIFICATE OF CORRECTION

PATENT NO. : 6,279,348 B1
DATED : August 28, 2001
INVENTOR(S) : Jason B. Elledge It is certified that error appears in the above-identified patent and that said Letters Patent is hereby corrected as shown below:

Title page,
Item [57], ABSTRACT,
Line 33, change "will" to -- to --

Column 5,
Line 30, insert a period after "display"
Line 53, change "204" to -- 104 --
Line 62, insert a period after "operation"
Line 63, change "heater" to -- heated --
Line 64, change "described" to -- desirable --
Line 65, change "hokes" to -- holes --

Column 6,
Line 23, change "cacuum" to -- vacuum --

Column 10,
Line 50, insert a comma after "hole"
Line 52, change "surfaces" to -- surface --
Line 53, after "layer" delete "is"
Line 59, before "cross-sectional" change "the" to -- a --

Column 11,
Line 52, after "planar" and before "and" insert -- face --

Column 12,
Lines 18-19, delete "which, prior to the step of removing the face plate assembly from the template"
Line 54, change "nold" to -- mold --

Signed and Sealed this

Eleventh Day of November, 2003

JAMES E. ROGAN
*Director of the United States Patent and Trademark Office*